July 12, 1932.  J. L. ANDERSON  1,866,695
TORCH CUTTING MACHINE
Filed July 30, 1931  4 Sheets-Sheet 2
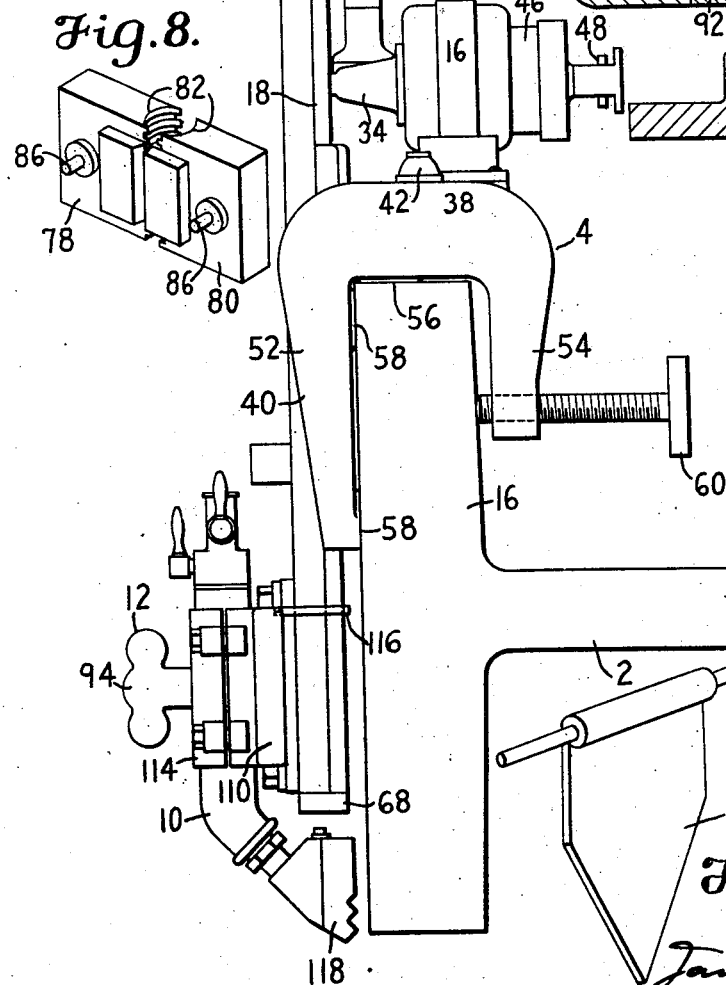
Fig. 2.
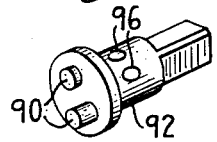
Fig. 7.
Fig. 8.
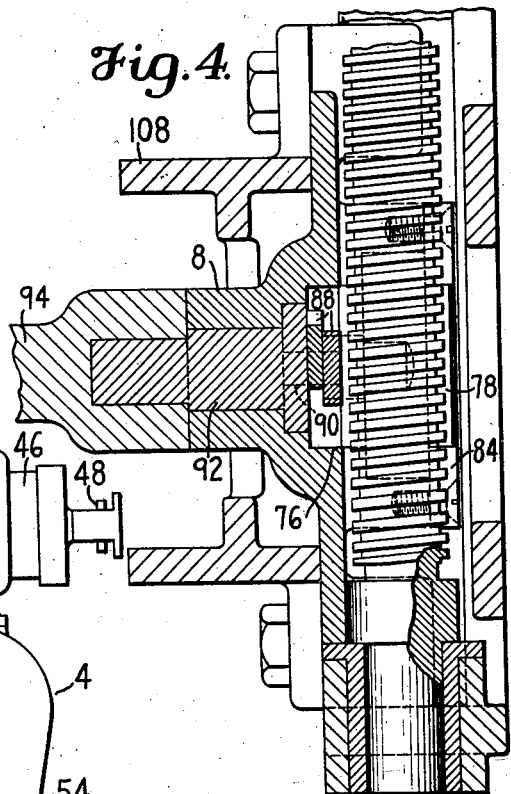
Fig. 4.
Fig. 9
INVENTOR
James L. Anderson
BY J. F. Brandenburg
ATTORNEY

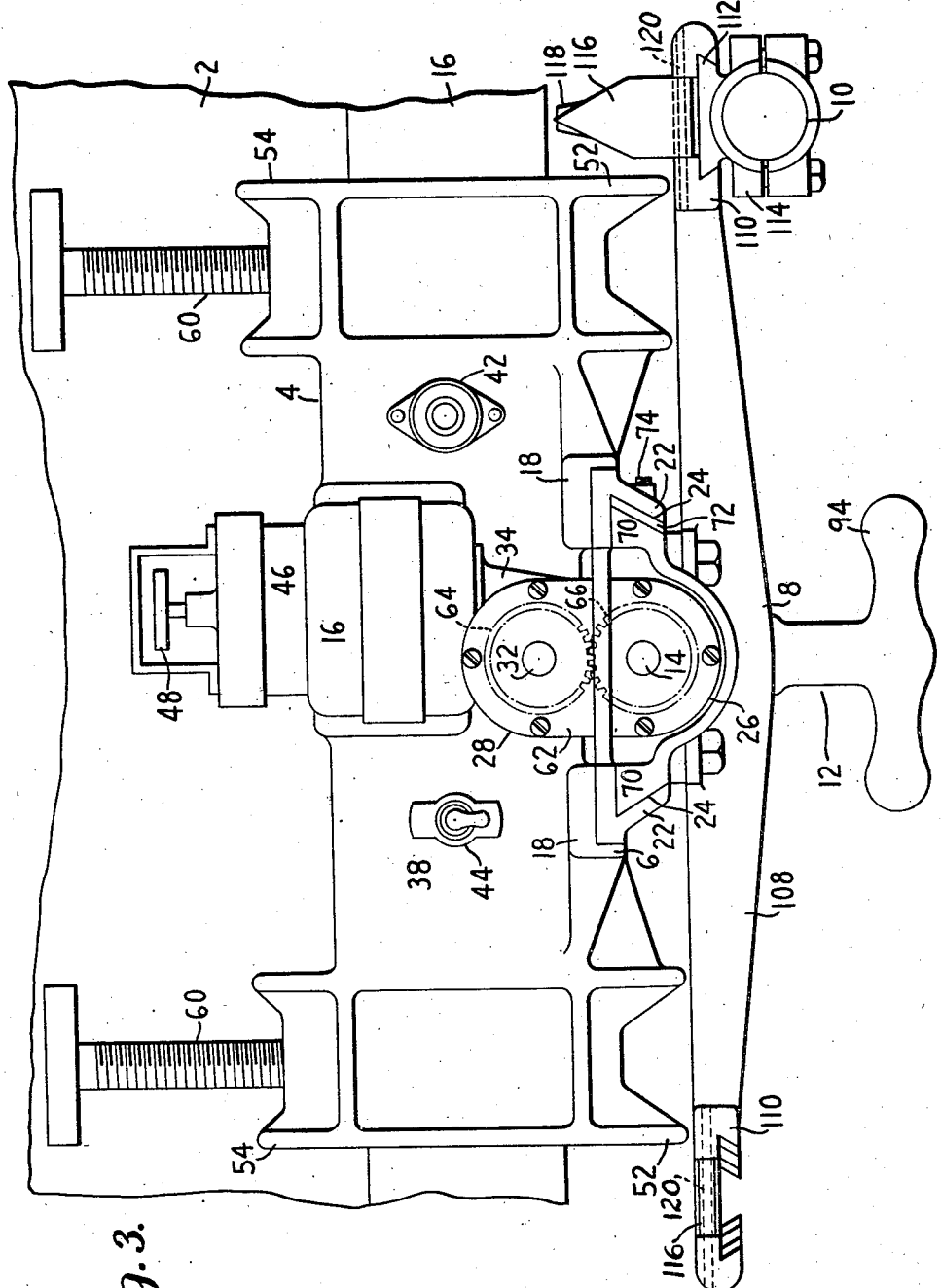

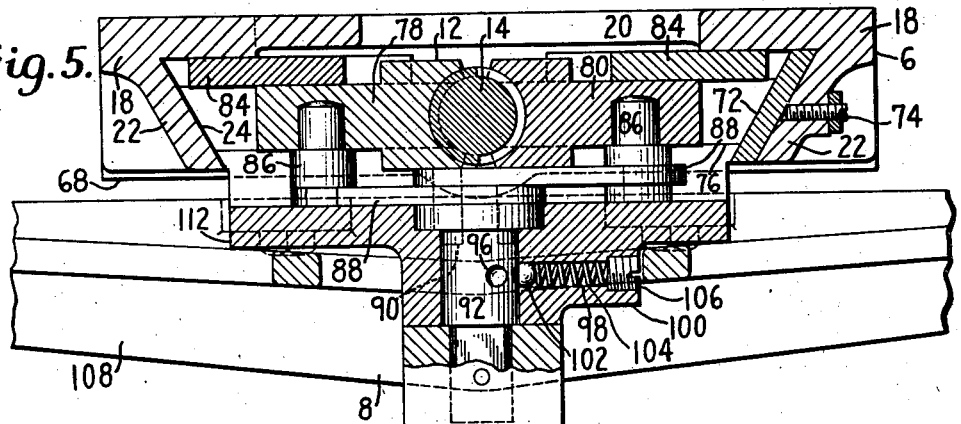
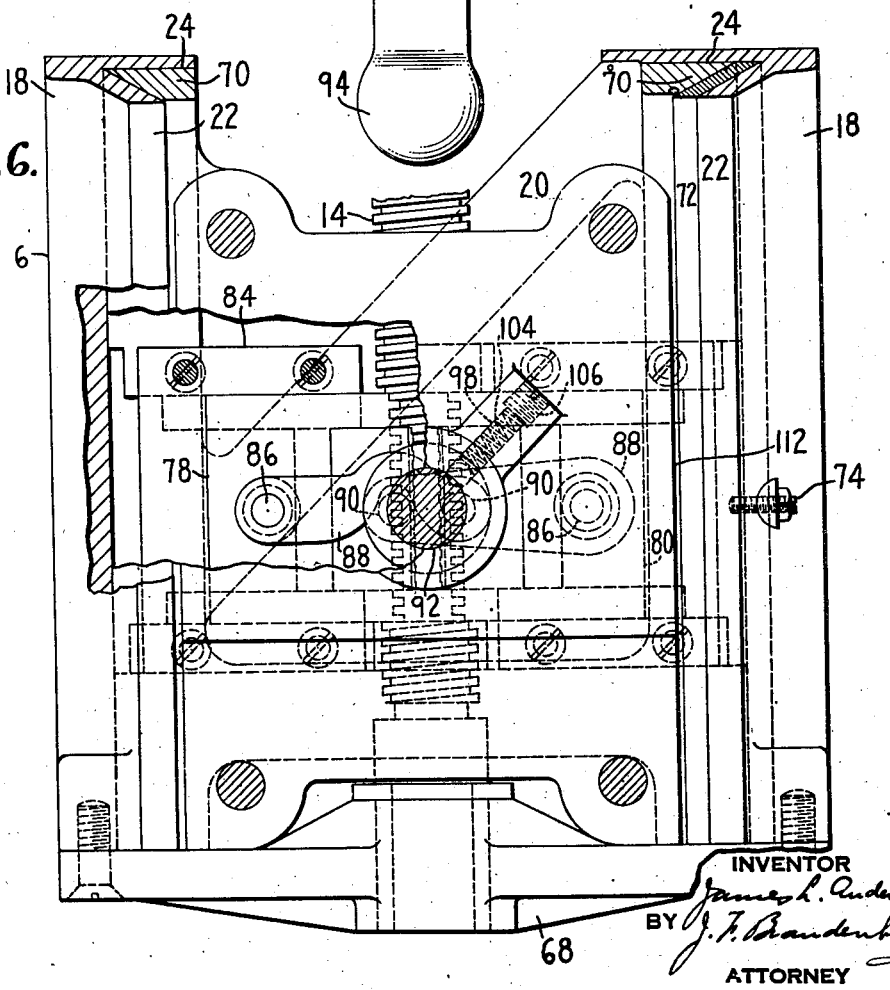

Patented July 12, 1932

1,866,695

UNITED STATES PATENT OFFICE

JAMES L. ANDERSON, OF TENAFLY, NEW JERSEY, ASSIGNOR TO AIR REDUCTION COMPANY, INCORPORATED, OF NEW YORK, N. Y., A CORPORATION OF NEW YORK

TORCH CUTTING MACHINE

Application filed July 30, 1931. Serial No. 553,931.

This invention relates, specifically, to a machine or apparatus for transverse cutting of flanged shapes, more especially an apparatus to be secured to the flange or flanges of a shape to cut these flanges. The invention is applicable to the cutting of the flanges of H, I or channel shapes, the particular purpose for which the illustrated embodiment was designed being to cut the flanges of H columns or beams. However, it will be apparent that the invention is applicable to the cutting of plate metal sections whether flanged or not.

It has been customary to cut H shapes to specified lengths with a hand cutting torch. Cuts made in this way are more or less ragged and inaccurate, and considerable time and expense are often required in machining the cut ends. A rather complicated and expensive, stationary machine, to which the columns must be brought, having a plurality of torches and means for operating them to cut the flanges and web in one operation, has been proposed.

In an accompanying application Serial No. 553,932, filed July 30, 1931, I disclose a small and simple machine which can be easily carried about and can be affixed to a flange of a shape of this character, to cut the web quickly, cleanly and truly in a mechanical manner, as the term mechanical is understood in this art. The present invention provides another small, carriable machine or apparatus for cutting the flanges, preferably before the web is cut.

The purpose of the invention, stated specifically, is to provide a simple, small, light, relatively inexpensive, easily portable machine, which can be instantly positioned to establish the location of the line of cut by a single setting in relation to a single mark, which can be quickly and easily affixed to one edge of a flange at any position along its length and when affixed is perfectly trued for the gas cutting operation, which will cut sections varying considerably in width, and with which the desired cut can be executed expeditiously, economically and with entire exactitude. The machine is well adapted for vertical cutting. In the case of H columns or the like, the section is placed with its flanges vertical, and the machine is applied first to one upstanding flange and then to the other.

Two machines constructed in accordance with the two applications constitute a very advantageous equipment for cutting these shapes, minimizing handling by crane or otherwise of the massive sections, and making possible a severance so smooth and precise that there need be little or no subsequent machining.

The machine can also be used for cutting plate metal in any position, whether flanged or not, it being simply necessary to affix the machine to an edge of the plate.

Other objects and features of the invention, and their applicability to various operations, will be understood from the disclosure of the present preferred embodiment illustrated in the accompanying drawings and described in the body of the specification.

In the drawings, which form a part hereof:

Fig. 2 is a side elevational view of the apparatus.

Fig. 3 is a plan view of the apparatus.

Fig. 4 is a detail sectional view, on the line 4—4 of Fig. 1, parts being shown in elevation.

Fig. 5 is a transverse sectional view, on the line 5—5 of Fig. 1, parts being shown in elevation.

Fig. 6 is a detail elevational view of the lower end of the frame and of the carriage, parts being broken away to illustrate the construction of the clutch mechanism.

Figs. 7 and 8 are perspective detail views of coupling and uncoupling devices.

Fig. 9 is a perspective view of a pointer and its pivot pin.

Figure 1:
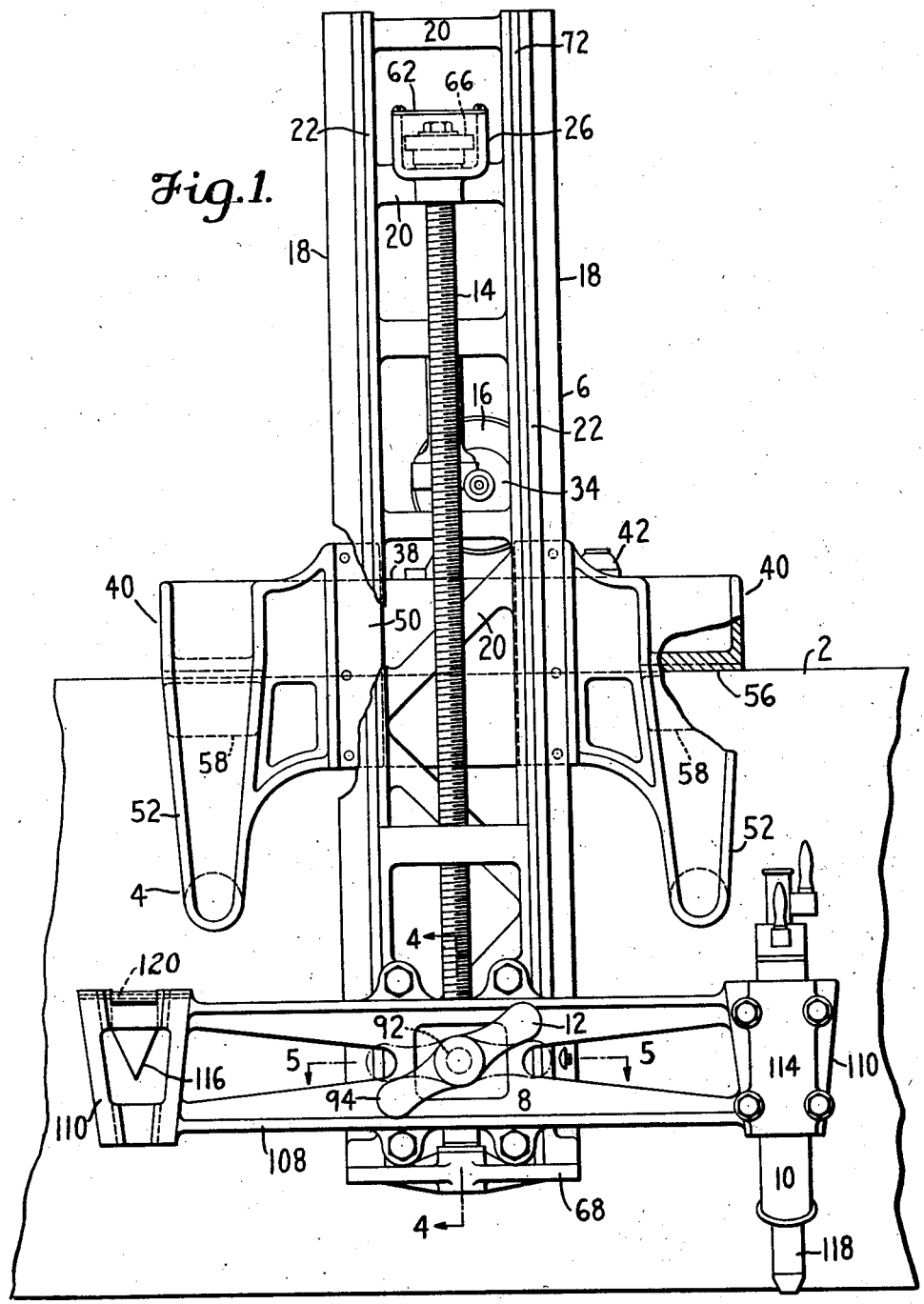
Fig. 1 is a front elevational view of apparatus embodying the invention, shown mounted upon a member to be cut, portions of the apparatus being broken away for a clearer showing of details of construction.

The cutting machine is shown mounted upon an H cloumn 2, which lies horizontally with its flanges 16 vertical. The machine is held by its clamping means 4 in fixed relation to one of the flanges. The machine includes, in addition to the clamping means, a vertical frame 6 and a carriage 8 supporting a torch 10, the carriage being connected by means of clutch means 12 to a rotating worm shaft 14, which can be driven from a motor 16. While a section of an H beam or column has been used to illustrate an application of the invention, the machine can be as readily associated with flanges of other shapes, or with any plate-like member to be cut.

The frame 6 preferably consists of two vertical side bars 18 united by integral cross ribs 20. Each of the side bars is formed with an outwardly extending flange 22, in which there is an angular groove 24 to provide ways for the carriage.

Integral with the frame, and on opposed sides of an upper rib 20, are two cup-shaped bosses 26 and 28, in the bottom of each of which is a bearing opening. A bearing lug 30 may also be provided as a part of another rib, at the back of the frame. This lug has an opening in alinement with the opening through the boss 26, the alined openings being intended to receive bushings to form bearings for a countershaft 32 extending vertically from the reduction gearing housing 34, which is mounted upon, and contains gears directly driven by, the motor 16.

The motor is carried upon a platform forming a part of the clamping means 4, and specifically of the bridge 38 between the two yoke arms 40 of this clamping means. Upon the bridge 38 may be provided suitable receptacles for a plug-in box 42 for making electrical connection with the conductors of the motor and for a switch 44 for controlling the operation of the motor. The motor itself has a housed governor 46, the parts of which are not here illustrated and which may be of any type which is capable of causing the motor to rotate at a uniform speed adjustable for any desired rate of cutting. An adjusting knob 48 extending from the governor housing provides for changing the speed of the motor at will. It will be noted that all the motor controls are located for immediate accessibility, enabling emergency settings to be made without loss of time.

The vertical frame 6 is screwed or bolted at a region intermediate its ends to face portions 50 formed on the bridge 38. The arms 40 comprise front and rear jaws 52 and 54 to embrace the flange of the member to be cut. Accurately faced pads 56 on the under side of the bridge 38 and other pads 58 on the inner faces of the front jaws 52 true the machine accurately with respect to the top and front faces of the flange to which the machine is clamped. Clamp screws 60 threading through the rear jaws bear against the back of the flange.

At the upper end of the countershaft 32, and within the housing provided by the cup-shaped bosses 26, the top of which is normally closed by a cover plate 62, there is secured a gear 64 engaged by another gear 66, which latter is secured to the upper end of the worm shaft 14. The lower end of this shaft is carried in a foot bearing formed in a foot-plate 68 secured across the lower end of the frame.

The carriage 8 takes the form of a substantially flat, oblong rectangular part of skeleton construction, having beveled side edges 70 to cooperate with the inclined retaining faces of the guide grooves 24 of the frame 6. A gib 72 and screws 74 provide for adjustment against play of the carriage in its vertical guide.

Intermediate its upper and lower ends, the carriage is formed to present a transverse recess 76, at the back, and within this recess elements of a clutch to couple and uncouple the carriage from the screw are placed. These elements consist of a pair of split-nut members 78 and 80. The ends of the nuts toward the shaft 14 are formed with threaded segments 82 for engagement with the screw. The nut members are reduced at the ends opposite the threaded segments, a pair of bearing plates 84 secured to the carriage serving to keep the nut members in position. Each of the nut members has a pivot post 86, to which posts links 88 are connected, these links being arranged to clear each other. The opposite ends of the links are connected to crank pivots 90 on the end of a stub-shaft 92. This shaft passes through a bearing in the carriage and is pinned, at the front, to a T-handle 94.

The stub shaft 92 has a pair of recesses 96 at the plane of an opening 98, drilled through a boss 100 of the carriage 8, in which opening there is a ball 102 pressed by a spring 104, the latter retained by a plug 106.

The ball is pressed into enagement with one or other of the recesses 96 in accordance with the position of the handle, and therefore of the nut members, with relation to the worm shaft. By such means the in or out position of the clutch can be determined by the operator by the feel of the handle.

As shown in dotted lines in Fig. 1, when the handle is turned to separate the nut members from the worm shaft, it is disposed substantially transversely of the vertical axis of the apparatus, and in this position rests firmly in the hand of the operator, so that his hand would naturally resist gravitational effects which normally force the carriage to fall if the carriage were not otherwise restrained. The full line representation of the handle illustrates the clutch-in position, showing that only a small manual turning movement is required to connect or disconnect the carriage from the screw.

A transverse (horizontal) torch arm 108 is secured at its middle to the lower portion of the carriage 8. At its opposite ends this arm has two sockets 110. The sockets are preferably trapezoidal to receive a taper dovetail 112 on the torch holder 114. The sockets at the opposite ends of the arm are identical so that the torch holder can be associated for easy change with either of them. An index 116 is associated with each socket 110. Each of these pointers is hung on a pivot pin 120 in an opening in the back wall of the corresponding socket, enabling it to be swung rearward into proximity to the face of the work to be cut. This is shown at the right in Fig. 3, where the index or pointer is represented as having been lifted to a horizontal position, its end being in vertical alinement with the torch tip 118. When the machine is set so that the index points to a mark on the work, a true line of cut at the proper place is preestablished, since the precision bosses 56 and 58 automatically true the apparatus and, by aid of the index, the apparatus can be instantly set where the cut is to be made.

The torch 10 may have any suitable cutting tip 118, but preferably utilizes the principles of the torch set forth in my copending application, Serial No. 502,026, filed December 13, 1930.

In the use of the machine, it is applied so that the arms 40 embrace the upper edge portion of the flange along which the cut is made, the bosses 56 and 58 resting against their respective surfaces, and the index 116 of the socket in which the torch holder and torch are placed being located in proper relation to a marking upon the top edge or face of the flange. The handle 94 is moved to the position in which the nut members 78 and 80 are disengaged from the worm shaft 14. Connection is now made through the plug-in box 42 between the motor 16 and a source of electrical energy, and the circuit is completed by means of the switch 44.

The heating and cutting gases are now fed to the tip 118, and the preheating jets are ignited. When the metal at the bottom reach of the metal face to be cut has attained a desired heat, the cutting oxygen jet is turned on, and as soon as the cut has started, the handle 94 is actuated to couple the carriage 8 to the worm shaft. The torch now moves upwardly, cutting as it goes. If the speed requires adjustment, this is done instantly at knob 48; in case of an emergency change, handle 94 may be grasped and manipulated to uncouple or couple the carriage, as desired, the carriage sliding in the ways at the urge of the hand grasping the handle.

When the torch has cut to its upper limit, the gas may be turned off, the handle manipulated, and the carriage again returned to its lowermost or to any intermediate point of travel.

The torch 10 may be an oxyacetylene cutting torch, or it may effect the actual cut in the metal by the production of an extremely high melting temperature, such as is produced in the so-called "atomic hydrogen" method of cutting metal.

When one flange has been cut, the machine is applied to the other flange and this flange is cut in the same manner. The web of the member is cut by another simple machine constituting the subject-matter of my copending application, or by other apparatus.

Many changes can be made in the apparatus without substantially departing from the invention set forth in the accompanying claims.

I claim:

1. A portable torch cutting machine of the character described, having clamping means for affixing it over one edge only of a plate part to be cut, a frame rigidly united with said clamping means so as to extend parallel with the face of the part to which the machine is affixed, means associated with the clamping means for automatically truing the machine, and a mechanically propelled torch carriage guided on said frame.

2. An apparatus for cutting the flanges of H shapes and the like, having a clamp for affixing the apparatus over the upper edge first of one upstanding flange and then of the other, a frame rigid with said clamp, a torch carriage, and mechanism for propelling said carriage vertically of said frame.

3. An apparatus for cutting the flanges of H shapes and the like, having a clamp for affixing the apparatus over the upper edge of first one upstanding flange and then of the other, a frame fixed intermediate its ends to the outer part of said clamp, a torch carriage, and mechanism for propelling said carriage vertically of said frame.

4. An apparatus for cutting the flanges of H shapes and the like, having a clamp for affixing the apparatus over the upper edge first of one upstanding flange and then of the other, a guide frame rigid with said clamp, a torch-carriage movable along said frame, a screw on said frame coupled with said carriage, a motor mounted on the clamp, and a shaft driven by said motor and extending upward parallel with said screw and geared to the upper portion of the latter.

5. A portable torch cutting machine having clamping means for affixing it over one edge of a plate or flange by gripping the opposite faces of the plate, a torch carriage guide fixed to the body of said clamping means, and elements on said clamping means adapted to true said guide in all directions by bearing at spaced regions against one face and the edge surface of the plate.

6. A portable torch machine for vertical cutting having means for affixing it over the upper edge of a flange, a vertical guide frame, a torch carriage on said frame, a motor-driven shaft on the frame for propelling said carriage, a clutch on the carriage for coupling and uncoupling with said shaft, and a handle for operating said clutch, said handle being adapted to enable the operator to sustain or shift the carriage when it is uncoupled from said shaft.

7. A torch cutting machine comprising a support, a guide, a torch carriage movable on said guide, a motor-driven screw for propelling said carriage, a split-nut clutch on the carriage for engagement and disengagement with said screw, and a handle connected with the parts of said clutch, the connections being of such character that a slight turn of the handle will couple or uncouple the carriage.

8. A portable torch cutting machine of the character described, having a clamp for affixing the machine over one edge of a plate or flange, elements on said clamp for complete truing of the machine by bearing at spaced regions against one face and the edge surface of the plate, and an index for setting the machine in relation to a mark.

9. A portable torch cutting machine of the character described, having a clamp for affixing it over one edge of a plate or flange, a guide frame fixed at the outer part of said clamp, a carriage movable on said guide frame, mechanism for propelling said carriage, a torch arm extending transversely in both directions from said carriage, and sockets on said torch arm adapted to receive a torch holder interchangeably at distances from opposite sides of the carriage.

JAMES L. ANDERSON.